United States Patent
Huang et al.

(10) Patent No.: US 6,829,578 B1
(45) Date of Patent: Dec. 7, 2004

(54) TONE FEATURES FOR SPEECH RECOGNITION

(75) Inventors: Chang-Han Huang, Taipei (TW); Frank Torsten Bernd Seide, Taipei (TW)

(73) Assignee: Koninklijke Philips Electronics, N.V., Eindhoven (NL)

( * ) Notice: Subject to any disclaimer, the term of this patent is extended or adjusted under 35 U.S.C. 154(b) by 454 days.

(21) Appl. No.: 09/869,942

(22) PCT Filed: Nov. 10, 2000

(86) PCT No.: PCT/EP00/11293
§ 371 (c)(1),
(2), (4) Date: Jul. 9, 2001

(87) PCT Pub. No.: WO01/35389
PCT Pub. Date: May 17, 2001

(30) Foreign Application Priority Data

Nov. 11, 1999 (EP) .......................... 99203766

(51) Int. Cl.$^7$ .............................. G10L 19/14
(52) U.S. Cl. .................. 704/211; 704/205; 704/207; 704/216; 704/208
(58) Field of Search .................. 704/205, 207, 704/208, 211, 214, 216, 217

(56) References Cited

U.S. PATENT DOCUMENTS

| | | | |
|---|---|---|---|
| 4,783,807 A | * 11/1988 | Marley | 704/235 |
| 5,384,893 A | * 1/1995 | Hutchins | 704/267 |
| 5,625,749 A | * 4/1997 | Goldenthal et al. | 704/254 |
| 5,751,905 A | * 5/1998 | Chen et al. | 704/254 |
| 5,806,031 A | * 9/1998 | Fineberg | 704/254 |

FOREIGN PATENT DOCUMENTS

EP 0 838 805 A2 * 4/1998 ............. G10L/9/00

OTHER PUBLICATIONS

Potisuk et al. "Speaker–Independent Automatic Classification of Thai Tones in Connected Speech by Analysis–Synthesis Method," IEEE, p. 632–635.*

Liu et al., "Tone Recognition of Polysyllabic Words in Mandarin Speech," Computer Speech & Language. Pp. 253–264. Jul. 3, 1989, No. 3, London, GB.*

Article: J. Acoust. Soc. Am., vol. 83, No. 1, Jan. 1988; Dik J. Hermes "Measurement of Pitch by Subharmonic Summation" pp. 257–264.

* cited by examiner

*Primary Examiner*—Vijay Chawan
(74) *Attorney, Agent, or Firm*—John Vodopia (57) ABSTRACT

Robust acoustic tone features are achieved first by the introduction of on-line, look-ahead trace back of the fundamental frequency (F0) contour with adaptive pruning, this fundamental frequency serves as the signal preprocessing front-end. The F0 contour is subsequently decomposed into lexical tone effect, phrase intonation effect, and random effect by means of time-variant, weighted moving average (MA) filter in conjunction with weighted (placing more emphasis on vowels) least squares of the F0 contour. The intonation effect is removed by subtraction of the F0 contour under superposition assumption. The acoustic tone features are defined as two parts. First, is the coefficients of the second order weighted regression of the de-intonation of the F0 contour over neighbouring frames. The second part deals with the degree of the periodicity of the signal, which are the coefficients of the second order regression of the autocorrelation. These weights of the second order weighted regression of the de-intonation of the F0 contour are designed to emphasize/de-emphasize the voiced/unvoiced segments of the pitch contour in order to preserve the voiced pitch contour for the semi-voiced consonants.

19 Claims, 4 Drawing Sheets

TONE FEATURES FOR SPEECH RECOGNITION

The invention relates to automatic recognition of tonal languages, such as Mandarin Chinese.

Speech recognition systems, such as large vocabulary continuous speech recognition systems, typically use an acoustic/phonetic model and a language model to recognize a speech input pattern. Before recognizing the speech signal, the signal is spectrally and/or temporally analyzed to calculate a representative vector of features (observation vector, OV). Typically, the speech signal is digitized (e.g. sampled at a rate of 6.67 kHz.) and pre-processed, for instance by applying pre-emphasis. Consecutive samples are grouped (blocked) into frames, corresponding to, for instance, 20 or 32 msec. of speech signal. Successive frames partially overlap, for instance, 10 or 16 msec, respectively. Often the Linear Predictive Coding (LPC) spectral analysis method is used to calculate for each frame a representative vector of features (observation vector). The feature vector may, for instance, have 24, 32 or 63 components. The acoustic model is then used to estimate the probability of a sequence of observation vectors for a given word string. For a large vocabulary system, this is usually performed by matching the observation vectors against an inventory of speech recognition units. A speech recognition unit is represented by a sequence of acoustic references. As an example, a whole word or even a group of words may be represented by one speech recognition unit. Also linguistically based sub-word units are used, such as phones, diphones or syllables, as well as derivative units, such as fenenes and fenones. For sub-word based systems, a word model is given by a lexicon, describing the sequence of sub-word units relating to a word of the vocabulary, and the sub-word models, describing sequences of acoustic references of the involved speech recognition unit. The (sub-)word models are typically based on Hidden Markov Models (HMMs), which are widely used to stochastically model speech signals. The observation vectors are matched against all sequences of speech recognition units, providing the likelihoods of a match between the vector and a sequence. If sub-word units are used, the lexicon limits the possible sequence of sub-word units to sequences in the lexicon. A language model places further constraints on the matching so that the paths investigated are those corresponding to word sequences which are proper sequences as specified by the language model. Combining the results of the acoustic model with those of the language model produces a recognized sentence.

Most existing speech recognition systems have been primarily developed for Western languages, like English or German. Since the tone of a word in Western based languages does not influence the meaning, the acoustic realization of tone reflected in a pitch contour is considered as noise and disregarded. The feature vector and acoustic model do not include tone information. For so-called tonal languages, like Chinese, tonal information influences the meaning of the utterance. Lexical tone pronunciation plays a part in the correct pronunciation of Chinese characters and is reflected by the acoustic evidence such as a pitch contour. For example, the language spoken most world-wide, Mandarin Chinese, has five different tones (prototypic within syllable pitch contours), commonly characterized as "high" (flat fundamental frequency $F_0$ contour) "rising" (rising $F_0$ contour), "low-rising" (a low contour, either flat or dip), "falling" (falling contour, possibly from high $F_0$), and "neutral" (neutral, possibly characterized by a small, short falling contour from low $F_0$). In continuous speech, the low-rising tone may be considered just a "low" tone. The same syllable pronounced with different tones usually has entirely different meanings. Mandarin Chinese tone modeling, intuitively, is based on the fact that people can recognize the lexical tone of a spoken Mandarin Chinese character directly from the pattern of the voiced fundamental frequency.

Thus, it is desired to use lexical tone information as one of the knowledge sources when developing a high-accuracy tonal language speech recognizer. To integrate tone modeling, it is desired to determine suitable features to be incorporated in the existing acoustic model or in an additional tone model. It is already known to use the pitch (fundamental frequency, $F_0$) or log pitch as a component in a tone feature vector. Tone feature vectors typically also include first (and optionally second) derivatives of the pitch. In multi-pass systems, often energy and duration information is also included in the tone feature vector. Measurement of pitch has been a research topic for decades. A common problem of basic pitch-detection algorithms (PDAs) is the occurrence of multiple/sub-multiple gross pitch errors. Such errors distort the pitch contour. In a classical approach to Mandarin tone models the speech signal is analyzed to determine if it is voiced or unvoiced. A pre-processing front-end must estimate pitch reliably without introducing multiple/sub-multiple pitch errors. This is mostly done, either by fine-tuning thresholds between multiple pitch errors and sub-multiple pitch errors, or by local constraints on possible pitch movements. Typically, the pitch estimate is improved by maximizing the similarity inside the speech signal in order to be robust against multiple/sub-multiple pitch errors via smoothing, e.g. median filter, together with prior knowledge of the reasonable pitch range and movement. The lexical tone of every recognized character or syllable, is decoded independently by stochastic HMMs. This approach has many defects. A lexical tone exists only on the voiced segments of Chinese characters and it is therefore desired to extract pitch contours for the voiced segments of speech. However, it is notoriously difficult to take a voiced-unvoiced decision for a segment of speech. A voiced/unvoiced decision cannot be determined reliably at pre-processing front-end level. A further drawback is that the smoothing coefficients (thresholds) of the smoothing filter are quite corpus dependent. In addition, the architecture of this type of tone model is too complex to be applied on real-time, large vocabulary dictation system which nowadays are mainly executed a on personal computer. To overcome multiple/sub-multiple pitch errors, the dynamic programming (DP) technique has also been used in conjunction with the knowledge of continuity characteristics of pitch contours. However, the utterance-based nature of plain DP prohibits its use in online systems.

It is an object of the invention to improve the extraction of tone features from a speech signal. It is a further object to define components, other than pitch, for a speech feature vector suitable for automatic recognition of speech spoken in a tonal language.

To improve the extraction of tone features, the following algorithmic improvements are introduced:

A two step approach to pitch extraction technique:
  At low resolution, a pitch contour is determined, preferably in the frequency domain
  At high resolution fine tuning occurs, preferably in the time domain by maximization of the normalized correlation inside quasi-periodic signal in an analysis window that contains more than one complete pitch period.

The low resolution pitch contour determining preferably includes:
  Determining pitch information based on a similarity measure inside the speech signal, preferably based on subharmonic summation in the frequency domain
  Using dynamic programming (DP) to eliminate multiple and sub-multiple pitch errors.
  The dynamic programming preferably includes:
    Adaptive beam-pruning for efficiency,
    Fixed-length partial traceback for guaranteeing a maximum delay, and
    Bridging unvoiced and silence segments.

These improvements may be used in combination or in isolation, combined with conventional techniques.

To improve the feature vector, the speech feature vector includes a component representing an estimated degree of voicing of the speech segment to which the feature vector relates. In a preferred embodiment, the feature vector also includes a component representing the first or second derivative of the estimated degree of voicing. In an embodiment, the feature vector includes a component representing a first or second derivative of an estimated pitch of the segment. In an embodiment the feature vector includes a component representing the pitch of the segment. Preferably, the pitch is normalized by subtracting the average neighborhood pitch to eliminate speaker and phrase effect. Advantageously, the normalization is based on using the degree of voicing as a weighting factor. It will be appreciated that a vector component may include the involved parameter itself or any suitable measure, like a log, of the parameter.

It should be noted that also a simplified Mandarin tone model has been used. In such a model a pseudo pitch is created by interpolation/extrapolation from voiced to unvoiced segments since a voiced/unvoiced decision cannot be determined reliably. Knowledge of a degree of voicing has not been put to practical use. Ignoring the knowledge of the degree of voicing is undesired, since the degree of voicing is a knowledge source that certainly improves recognition. For instance, the movement of pitch is quite slow (1%/1 ms) in voiced segments, but jumps quickly in voiced-unvoiced or unvoiced-voiced segments. The system according to the invention explores the knowledge of degree of voicing.

These and other aspects of the invention will be apparent from and elucidated with reference to the embodiments shown in the drawings.

The speech processing system according to the invention may be implemented using conventional hardware. For instance, a speech recognition system may be implemented on a computer, such as a PC, where the speech input is received via a microphone and digitized by a conventional audio interface card. All additional processing takes place in the form of software procedures executed by the CPU. In particular, the speech may be received via a telephone connection, e.g. using a conventional modem in the computer. The speech processing may also be performed using dedicated hardware, e.g. built around a DSP. Since speech recognition systems are generally known, here only details relevant for the invention are described in more detail. Details are mainly given for the Mandarin Chinese language. A person skilled in the art can easily adapt the techniques shown here to other tonal languages.

Figure 1:
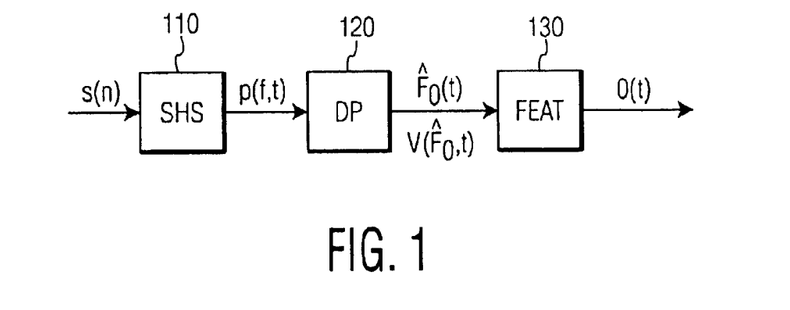
FIG. 1 illustrates a three-stage extraction of tone features.
Figure 2:
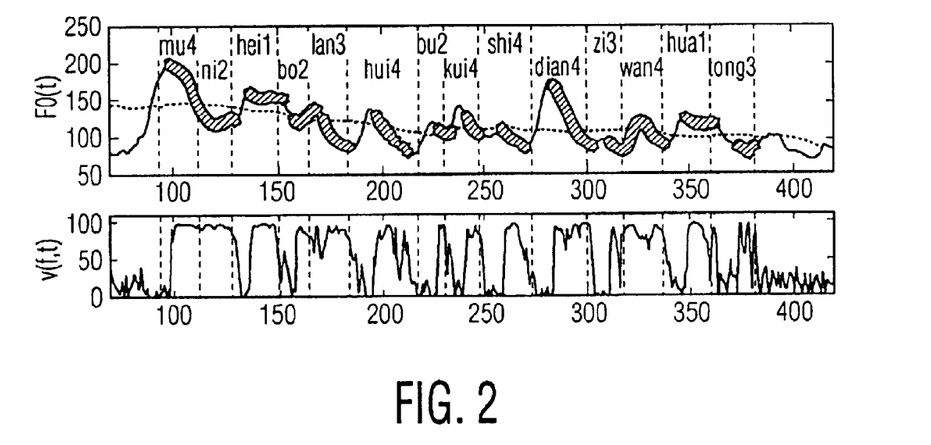
FIG. 2 shows an example pitch contour and degree of voicing.

FIG. 1 illustrates three independent processing stages to extract tone features of an observation vector $\bar{o}(t)$ from a speech signal s(n). The invention offers improvements in all three areas. Preferably, the improvements are used in combination. However, they can also be used independently where for the other stages conventional technology is used. In the first stage a periodicity measure (pitch) is determined. To this end, the incoming speech signal s(n) is divided into overlapping frames with preferably a 10 msec. shift. For every frame at time t a measure p(f, t) for a range of frequencies f is determined expressing how periodic the signal is for the frequency f. As will be described in more detail below, preferably the subharmonic summation (SHS) algorithm is used to determine p(f, t). The second stage introduces continuity constraints to increase robustness. Its output is a sequence of raw pitch-feature vectors, which consist of the actual pitch estimate $\hat{F}_0(t)$ and the corresponding degree of voicing $v(\hat{F}_0(t),t)$ (advantageously a normalized short time autocorrelation is used as a measure of the degree of voicing). Preferably, the continuity constraints are applied using dynamic programming (DP) as will be described in more detail below. In the third stage, labeled FEAT, post-processing and normalization operations are performed and the actual sequence of tone features of the vector o(t) are derived. Details will be provided below.

Periodicity Measure

A preferred method for determining pitch information will now be described. The speech signal may be received in analogue form. If so, an A/D converter may be used to convert the speech signal into a sampled digital signal. Information of the pitch for possible fundamental frequencies $F_0$ in the range of physical vibration of human vocal cord is extracted from the digitized speech signal. Next, a measure of the periodicity is determined. Most pitch detection algorithms are based on maximizing a measure like p(f, t) over the expected $F_0$ range. In the time-domain, typically such measures are based on the signal's auto-correlation function $r_{s_t s_t}(1/f)$ or a distance measure (like AMDF). According to the invention, the subharmonic summation (SHS) algorithm is used, which operates in the frequency domain and provides the sub-harmonic sum as a measure. The digital sampled speech signal is sent to the robust tone feature extraction front-end where the sampled speech signal is, preferably, first low passed with cut-off frequency less than 1250 Hz. In a simple implementation, a low-pass filter can be implemented as a moving average FIR filter. Next, the signal is segmented into a number of analysis gates, equal in width and overlapped in time. Every analysis gate is multiplied ("windowed") by a commonly used kernel in speech analysis called hamming window, or equivalent window. The analysis window must contain at least one complete pitch period. A reasonable range of pitch period τ is within 2.86 ms=0.00286 s=1/350≦τ≦1/50=0.020 s=20 ms So, preferably the window length is at least 20 ms.

A representation of the sampled speech signal in an analysis gate (also referred to as segment or frame) is then calculated, preferably using the Fast Fourier transform (FFT), to generate the spectrum. The spectrum is then squared to yield the power spectrum. Preferably, the peaks of the amplitude spectrum are enhanced for robustness. The power spectrum is then preferably smoothed by a triangular kernel (advantageously with of low-pass filter coefficients: ¼, ½, ¼) to yield the smoothed amplitude spectrum. Next, it is preferred to apply cubic spline interpolation of $I_{resolution}$ points (preferably no more than 16 equidistant points per octave, at low frequency resolution, for fast finding the correct route) on the kernel smoothed amplitude spectrum. Auditory sensitivity compensation on spline interpolated power spectrum is preferably performed by an arc-tangent function on the logarithmic frequency scale:

$$A(\log_2 f) = 0.5 + \frac{\tan^{-1}(3.0 * \log_2 f)}{\pi}$$

For the possible fundamental frequencies $F_0$ in the range of physical vibration of human vocal cord, subharmonic summation is then applied to yield the information of the pitch.

$$\sum_{k=1}^{k=15} w_k * P(\log_2(kf)) * I(kf < 1250),$$

$$\forall k=1,2,\ldots,N_{subharmonics} w_k = (c)^{k-1},$$

where $P(\log_2(f)) = C(\log_2(f)) * A(\log_2(f))$, where $C(\log 2(f))$ is the spline interpolated from $S(\log_2(f))$, the power spectrum from FFT, c is the noise compensation factor. Advantageously, for microphone input: c=0.84; for telephone input: c=0.87. f is the pitch (in Hz), $50 \leq f \leq 350$. The SHS algorithm is described in detail in D. Hermes, "Measurement of pitch by subharmonic summation", J. Acoust. Soc. Am. 83 (1), January 1988, hereby included by reference. Here only a summary is given of SHS. Let $s_t(n)$ represent the incoming speech signal windowed at frame t and let $S_t(f)$ be its Fourier transform. Conceptually, the fundamental frequency is determined by computing the energy $E_f$ of $s_t(n)$ projected onto the sub-space of functions periodic with f:

$$E_f = \sum_{n=-\infty}^{\infty} |S_t'(nf)|^2$$

and maximizing with respect to f. In the actual SHS method described by Hermes, various refinements are introduced, by using instead the peak-enhanced amplitude spectrum $|S'_t|$, weighted by a filter W(f) representing the sensitivity of the auditory system, and emphasizing the lower harmonics by weighting with weights $h_i$, efficiently realized by means of Fast Fourier Transform, interpolation, using and superposition on logarithmic scale, arriving at:

$$p(f, t) = \sum_{n=1}^{N} h_1^{n-1}(|S_t'(nf)|W(nf))$$

In this equation, N represents the number of harmonics.

Continuity Constraints

A straightforward estimate of the pitch is given by: $\hat{F}_0(t) = \arg\max_f p(f,t)$. However, due to the lack of continuity constraints across frames, it is prone to so-called multiple and sub-multiple pitch errors, most prevalent in the telephone corpus due to broadband channel noise. According to the invention, the principle of dynamic programming is used to introduce continuity (in the voiced segments of speech). As such, pitch is not estimated in isolation. Instead, by considering the neighboring frames, pitch is estimated in a global minimum path error. Based on the continuity characteristic of pitch in voiced segments of speech, pitch varies within a limited range (around 1%/msec.). This information can be utilized to avoid multiple/submultiple pitch errors.

Using dynamic programming ensures that the pitch estimation follows the correct route. It should be realized that pitch changes dramatically on the voiced-unvoiced segments of speech. Moreover, a full search scheme for a given path boundary is time-consuming (due to its unnecessary long processing delay), which makes it almost impossible to implemented in real-time system for pitch tracking with subjective high tone quality. These drawbacks are overcome as will be described in more detail below.

Dynamic Programming

The continuity constraint can be included by formulating pitch detection as:

$$\hat{F}_0(1 \ldots T) = \underset{F_0(1 \ldots T)}{\operatorname{argmax}} \sum_{t=1}^{T} p(F_0(t), t) \cdot a_{F_0(t)|F_0(t-1)} \quad (1)$$

where $a_{f_2|f_1}$ penalizes or forbids rapid changes of pitch. By quantizing $F_0$, this criterion can be solved by dynamic programming (DP).

In many systems, the pitch value is set to 0 in silence and unvoiced regions. This leads to problems with zero variances and undefined derivatives at the voiced/unvoiced boundaries. It is known to "bridge" these regions by exponentially decaying pitch towards the running average. Advantageously, DP provides an effective way for bridging unvoiced and silence regions. It leads to "extrapolation" of a syllable's pitch contour (located in the syllable's main vowel), backwards in time into its initial consonant. This was found to provide additional useful information to the recognizer.

Partial Traceback

The fact that equation (1) requires to process the entire T frames of an utterance before the pitch contour can be decided renders it less suitable for online operation. According to the invention, a partial traceback is performed, exploiting the path merging property of DP. In itself the technique of back tracing is well-known from Viterbi decoding during speech recognition. Therefore, no extensive details are given here. It is preferred to use a fixed-length partial traceback that guarantees a maximum delay: at every frame t, the local best path is determined and traced back $\Delta T_1$ frames. If $\Delta T_1$ is large enough, the so-determined pitch $\hat{F}_0(t - \Delta T_1)$ can be expected to be reliable. Experiments show that the delay can be limited to around 150 msec., which is short enough to avoid any noticeable delay for the user.

Beam Pruning

In the above form, path recombinations constitute the major portion of CPU effort. For effort reduction, beam pruning is used. In itself beam pruning is also well-known from speech recognition and will not be described in full detail here. For every frame, only a subset of paths promising to lead to global optimum is considered. Paths with scores sc(t) with:

$$\frac{sc(t) - sc_{opt}(t - \Delta T_2)}{sc_{opt}(t) - sc_{opt}(t - \Delta T_2)} < threshold$$

are discontinued ($sc_{opt}(\tau)$=local best score at time $\tau$).

Since efficiency is a major concern, as much as possible pruning is preferred without damaging quality. In the dynamic programming step, dramatic changes exist in estimating pitch even after applying dynamic programming technique in the voiced-unvoiced segments of speech. This is because in pure silence region, there is no information of periodicity: all possible pitch values are equally likely. Theoretically, no pruning is necessary at this point. On the other hand, in pure speech region, there is a lot of periodicity information, the distribution of pitch have many peaks on the multiples/sub-multiples of correct pitch. At this point, pruning some paths which has very low accumulated score is appropriate. The pruning criteria preferably also consider the effect of silence. If at the beginning of a sentence there exists a silence region of more than approximately 1.0 sec., pruning should preferably not take place. Experiments have shown that by pruning some paths which have 'so far' an accumulated score of less than 99.9% of the 'so far' highest accumulated score will result in loosing the correct route of pitch. On the other hand, pruning some paths which have 'from 0.50 s to so far' accumulated a score of less than 99.9% of the 'from 0.50 s so far' highest accumulated score will result in keeping the correct route and save up to 96.6% loop consumption compared to full search scheme.

Reduction of Resolution

The number of path recombinations is proportional to the square of the DP's frequency resolution. Significant speed-up can be achieved by reducing the resolution of the frequency axis in DP. A lower resolution limit is observed at around 50 quantization steps per octave. Below that, the DP path becomes inaccurate. It has been found that the limit can be lowered further by a factor of three, if each frame's pitch estimate $\hat{F}_0(t)$ is fine-tuned after DP in the vicinity of the rough path. Preferably this is done by maximizing v(f, t) at higher resolution within the quantization step Q(t) from the low-resolution path, i.e.: $\hat{F}_0(t)=\arg \max_{f \in Q(t)} v(f,t)$ A preferred method for the maximization of the look-ahead, local likelihood of the F0 with adaptive pruning using the present invention will now be described. In summary, the following steps occur:

Calculating the transition scores of every possible pitch movement in the voiced segments of speech.

Calculating the current value of maximal sub-harmonic summation and the 'so far' accumulated path scores.

Determining adaptive pruning base on a certain history (lookback of length M) of the 'so far' best path and calculating the adaptive pruning threshold, then do path extension based on the degree of periodicity and pruning based on the adaptive pruning threshold.

Tracing back from the certain time-frame (lookahead trace back of length N) to the current time frame and output only the current time frame as the stable rough pitch estimate.

High-resolution, fine search in the neighborhood of the stable rough pitch estimate for estimating the precise pitch and output the precise pitch as the final results of the look-ahead adaptive pruning tracing back procedure.

In more detail the following occurs. Information of pitch is first processed by calculating transition probability of every possible pitch-movement where pitch movement is preferably measured on ERB auditory sensitivity scale, in the voiced segments of speech. The calculation of transition scores can be done as follows:

PitchMovementScore [k][j]=(1-(PitchMove/MaxMove)* (PitchMove/MaxMove)), where pitch movement and MaxMove are measured in ERB auditory sensitivity scale.

The movement of pitch will not exceed (1%/1 ms) in voiced segments [5], for a male speaker, F0 is around 50–120 Hz, for female speaker, F0 is around 120–220 Hz, the average of F0 is around 127.5 Hz From Hz to Erb: $\text{Erb(Hz)} = 21.4 * \log_{10}\left(1 + \frac{f}{230}\right)$;

MaxMove (in Hz) is 12.75 Hz within 10 ms.≒0.5 Erbs within 10 ms

Next, the concurrent value of maximal sub harmonic summation is calculated and the 'so far' (from the beginning of the speech signal to the concurrent time frame) accumulated path scores. The 'so far' accumulated path scores can be calculated using the following recursive formula: AccumulatedScores [j][frame-1]+PitchMovement [k][j] *CurrentSHS [k][frame];

Path extension only occurs on those possible pitch movements, with transition probability score greater than (preferably) 0.6. The path extensions with transition probability score less than or equal to 0.6 are skipped. Preferably, adaptive pruning is based on the accumulated path scores within history of (advantageously) 0.5 second. This is denoted as the ReferenceAccumulatedScore. Preferably, the adaptive path extension uses a decision criterion where a path extension only occurs for those possible pitch movements with a transition score greater than 0.6. A path extension with a transition score less than or equal to 0.6 is skipped. In addition or alternatively, adaptive pruning is based on the degree of voicing. A method according to claim 6 wherein the adaptive pruning uses a decision criteria based on the degree of voicing:

Prune tightly pruning on a path if the accumulated path scores within history of, for instance, 0.5 second is less than 99.9% of the maximal accumulated path scores within the same history and there exists much more information of periodicity at the current time frame, or expressed in a formula: if (AccumulatedScores [j][frame-1]-ReferenceAccumulatedScore) is less than 99.9% of the (MaxAccumulatedScores [frame-1]-ReferenceAccumulatedScore) and there is much more periodicity information at the current time frame (e.g., CurrentSHS [j][frame]≧80.0% of the CurrentMaxSHS [frame]).

Prune loosely on a path if there is little, vague information of pitch at current time frame, extend the previous path to the current most possible, maximal and minimal pitch movements. Loosely pruning occurs if there exists less information of periodicity at the current time frame. This is because the beginning of a sentence mostly consists of silence and as such the accumulated path scores is too small to prune tightly, which is different from the beginning of the sentence to the voiced-unvoiced segments. In that case, there is little, vague information of pitch at the current time frame. Loosely pruning occurs by extending the previous path to the current most possible, maximal and minimal pitch movements.

High-resolution, fine pitch search in the neighborhood of the stable rough pitch estimate for estimating the precise pitch uses a cubic spline interpolation on correlagram. This can significantly reduce the active states in the look-ahead adaptive pruning trace back of the $F_0$ without a trade-off in accuracy. The high-resolution, fine pitch search at high frequency resolution (for high pitch quality) uses maximization of the normalized correlation inside quasi-periodic signal in analysis window that contains more than one complete pitch period.

Default window length is two times the maximal complete pitch period.

$f_0 \geq 50$ Hz, pitch period $\leq \frac{1}{50} = 0.020$ s, window length=2*0.020 s=40 ms Using the look-ahead adaptive pruning trace back of the $F_0$, has the advantage that it is almost free from suffering multiple or sub-multiple pitch errors which exist in many pitch detection algorithm based on the peak-picking rules. Experiments have shown that both tone error rate (TER) and character error rate (CER) reduces significantly when compared to the heuristic peak-picking rules. Additionally, it improves the probability of accuracy without trade-off efficiency since it looks ahead 0.20 s and adaptively pruned many unnecessary paths based on the information of pitch, whatever voiced or unvoiced.

Features for Mandarin Speech Recognition

Referring to the five Mandarin lexical tones, the first (high) and third (low) tone mainly differ in pitch level, whereas the pitch derivative is close to zero. On the contrary, the second (rising) and fourth (falling) tone span a pitch range, but with clear positive or negative derivative. Thus, both pitch and its derivative are candidate features for tone recognition. The potential of curvature information (2nd derivative) is less clear.

According to the invention, the degree of voicing v(f; t) and/or its derivative are represented in the feature vector. Preferably the degree of voicing is represented by a measure of a (preferably normalized) short-time auto-correlation, as expressed by the regression coefficients of the second-order regression of the auto-correlation contour. This can be defined as:

$$v(f,t) = \frac{\sum_{n=N_1(t)}^{N_2(t)} s(n) \cdot s\left(n - \frac{f_{sample}}{f}\right)}{\left(\sum_{n=N_1(t)}^{N_2(t)} s^2(n) \cdot \sum_{n=N_1(t)}^{N_2(t)} s^2\left(n - \frac{f_{sample}}{f}\right)\right)^{\frac{1}{2}}} \leq 1$$

Using the degree of voicing as a feature, assists in syllable segmentation and in disambiguating voiced and unvoiced consonants. It has been verified that the maximal correlation of the speech signal can be used as a reliable measure of the pitch estimate (refer to the next table). This is partially due to the fact that maximal correlation is a measure of periodicity. By including this feature, it can provide information of the degree of periodicity in the signal, thus improving the recognition accuracy.

| | | | |
|---|---|---|---|
| Threshold: Corresponding Correlation of the pitch estimates | 0.52 | 0.80 | 0.92 |
| Global Error Rate: Conditioning on the correlation threshold. Estimated prob. of sub (multiples) pitch error between SHS and PDT | 16.734% | 4.185% | 1.557% |

Energy and its derivative(s) may also be taken as a tone features, but since these components are already represented in the spectral feature vector, these components are not considered here any further.

The tone features are defined as two parts. First is the regression coefficients of the second-order weighted regression of the de-intonated F0 contour over neighboring frames, with a window size related to the average length of a syllable and weights corresponding to the degree of the periodicity of the signal. The second part deals with the degree of the periodicity of the signal, which are the regression coefficients of the second-order regression of the auto-correlation contour, with a window size related to the average length of a syllable and the lag of correlation corresponding to the reciprocal of the pitch estimate from look-ahead tracing back procedure.

Long-term Pitch Normalization

In itself using pitch as a tone feature may in fact degrade recognition performance. This is caused by the fact that a pitch contour is a superposition of:
a) the speaker's base pitch,
b) the sentence-level prosody,
c) the actual tone, and
d) statistical variation.

Figure 3A:
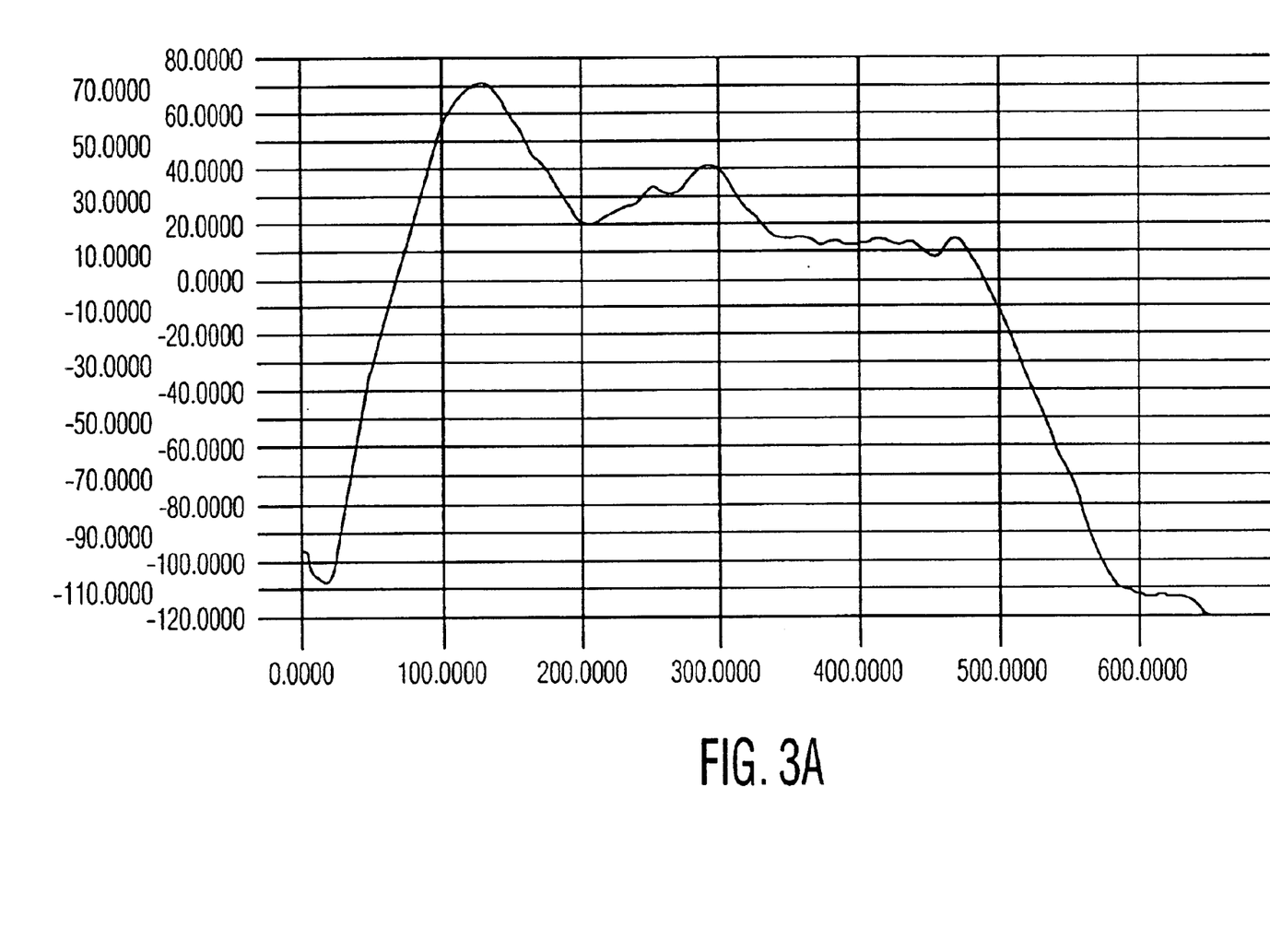
FIGS. 3A and B illustrate the use of a weighted filtering.
Figure 3B:
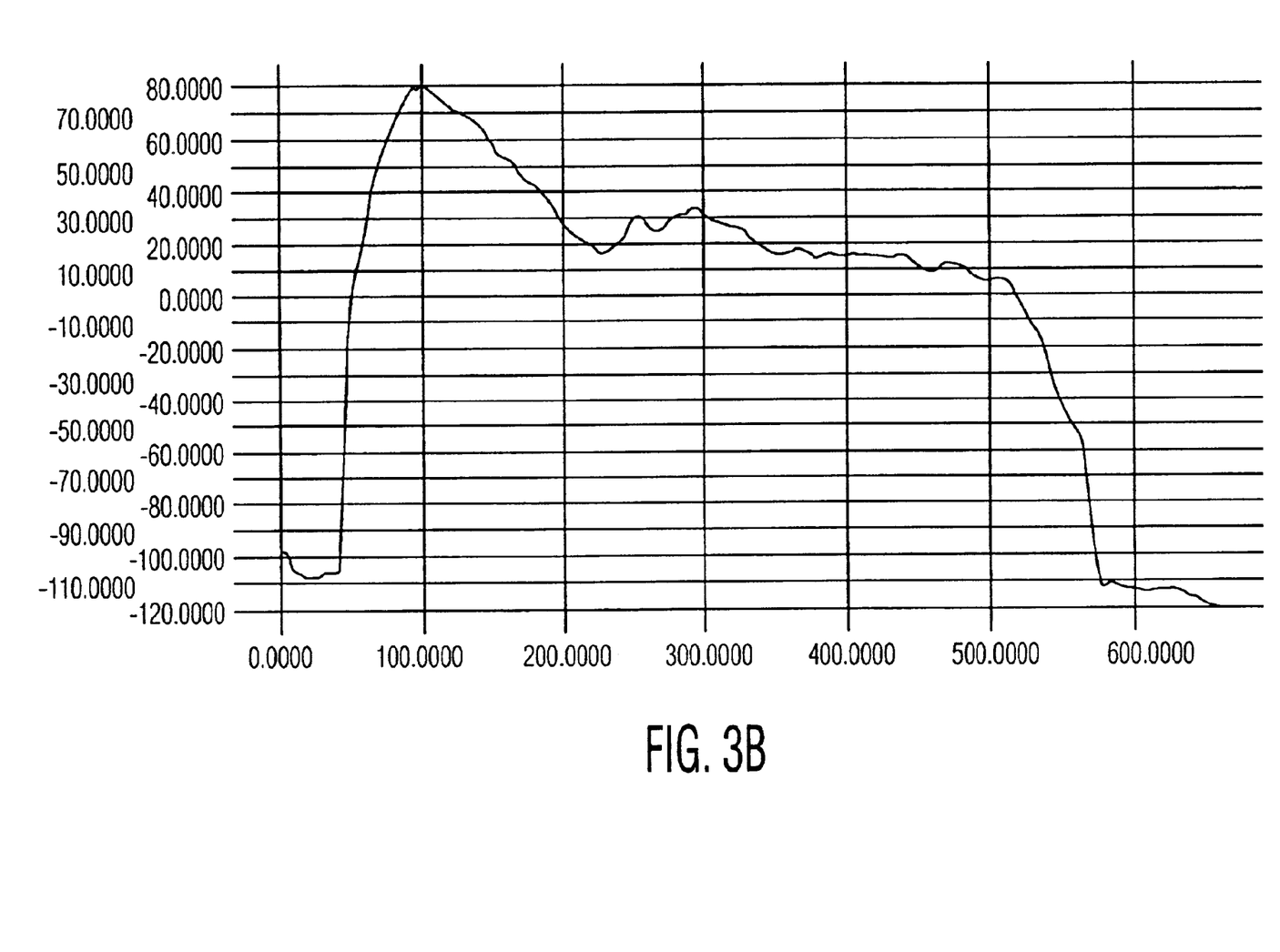

While (c) is the desired information and (d) is handled by the HMM, (a) and (b) are irrelevant for tone recognition, but their variation exceeds the difference between first and third tone. This is illustrated in FIG. 3 for an example pitch contour representing a spoken sentence 151 of the 863 male test set. In this sentence, the pitch level of first and third tone become indistinguishable, due to sentence prosody. Within the sentence, the phrase component spans already a range of 50 Hz, whereas the pitch of an adult speaker may range from 100 to 300 Hz. FIG. 3 shows on top the pitch contour, where the dotted line denotes the (estimated) phrase component. The thick lines denote the areas with a voicing degree above 0.6. The lower part of FIG. 3 shows the corresponding degree of voicing.

It has been proposed to apply "cepstral mean subtraction" to the log pitch to obtain gender-independent pitch contours. While this effectively removes the speaker bias (a), the phrase effect (b) is not accounted for.

According to the invention, the lexical tone effect present in the signal is kept by removing the phrase intonation effect and random effect. For Chinese, the lexical tone effect refers to the lexical pronunciation of tone specified within a Chinese syllable. The phrase intonation effect refers to the intonation effect exists in pitch contour which is caused by the acoustic realization of a multi-syllable Chinese word. Therefore, according to the invention, the estimated pitch $\hat{F}_0(t)$ is normalized by subtracting speaker and phrase effect. The phrase intonation effect is defined as the long-term tendency of the voiced $F_0$ contour, which can be approximated by a moving average of the $\hat{F}_0(t)$ contour in the neighborhood of t. Preferably a weighted moving average is used, where advantageously the weights relate to the degree of the periodicity of the signal. The phrase intonation effect is removed from the $\hat{F}_0(t)$ contour under superposition assumption. Experiments confirm this. This gives:

$$\hat{F}'_0(t) = \hat{F}_0(t) - \frac{\sum_{\tau=-\Delta T_3}^{+\Delta T_3} \hat{F}_0(t+\tau) \cdot w(\hat{F}_0(t+\tau), t+\tau)}{\sum_{\tau=-\Delta T_3}^{+\Delta T_3} w(\hat{F}_0(t+\tau), t+\tau)}, \quad (2)$$

In its simplest form, the moving average is estimated with w(f; t)=1, giving a straight-forward moving average. Preferably, a weighted moving average is calculated, where advantageously the weight represents the degree of voicing (w(f; t)=v(f; t)). This latter average yields a slightly improved estimate by focussing on clearly voiced regions. Optimal performance of the weighted moving average filter is achieved for a window of approximately 1.0 second.

A preferred method for decomposing the $F_0$ contour into a tone effect, phrase effect and random effect involves the following steps:

Calculating the normalized-correlation of the speech signal, with time lag corresponding to the reciprocal of the pitch estimate from look-ahead tracing back procedure, Smoothing the normalized-correlation contour by a moving average or median filter over neighboring frames (with window size relating to the average length of a syllable).

Preferably, the moving average filter is:

$$Y\text{-smoothed}(t)=(1*y(t-5)+2*y(t-4)+3*y(t-3)+$$

$$4*y(t-2)+5*y(t-1)+5*y(t)+5*$$

$$y(t+1)4*y(t+2)+3*y(t+3)+2*y(t+4)+$$

$$1*y(t+5))/30$$

Calculating the coefficients of the second order regression of the auto-correlation over neighboring frames (with window size related to the average length of a syllable). Preferably, the calculation of the regression coefficients $\gamma_0, \gamma_1, \gamma_2$ of the smoothed auto-correlation uses least square criteria over n (n=11) frames. For run-time efficiency, this operation can be skipped and $\gamma_0$ can be replaced by smoothed correlation coefficients. A constant data matrix is used:

$$\begin{pmatrix} 2n+1 & 0 & \frac{n(n+1)(2n+1)}{3} \\ 0 & \frac{n(n+1)(2n+1)}{3} & 0 \\ \frac{n(n+1)(2n+1)}{3} & 0 & \frac{n(n+1)(2n+1)(3n^2+3n-1)}{15} \end{pmatrix},$$

Alternatively, the calculation of the regression coefficients of the $F_0$ contour uses weighted least square criteria over n (n=11) frames, with a data matrix which is a function of weights, $$\begin{pmatrix} \sum_{l=-n}^{n} u_t & \sum_{l=-n}^{n} u_t l & \sum_{l=-n}^{n} u_t l^2 \\ \sum_{l=-n}^{n} u_t l & \sum_{l=-n}^{n} u_t l^2 & \sum_{l=-n}^{n} u_t l^3 \\ \sum_{l=-n}^{n} u_t l^2 & \sum_{l=-n}^{n} u_t l^3 & \sum_{l=-n}^{n} u_t l^4 \end{pmatrix} \text{ where weights are: } u_t = \begin{pmatrix} 1, \gamma_{0,t} \geq 0.4 \\ \gamma_{0,t} \\ 0, \gamma_{0,t} \leq 0.1 \end{pmatrix}$$

Calculating the regression weights of the $F_0$ contour based on the constant terms of the regression coefficients of the second order regression of the auto-correlation over neighboring frames (with a window size related to the average length of a syllable). Preferably, the calculation of the regression weights is based on the following criterion:

If the constant term $\gamma_{0,t}$ of the regression coefficients of the auto-correlation is greater than 0.40, then the regression weight for this frame t is set at approximately 1.0, If the constant term $\gamma_0$, of the regression coefficients of the auto-correlation is less than 0.10, then the regression weight for this frame t is set at approximately 0.0, Otherwise the regression weight for this frame t is set at the constant term of the regression coefficients of the auto-correlation. For the weighted regression and weighted long term moving average filter preferably the following weights are used:

$$u_t = \begin{pmatrix} 1, \gamma_{0,t} \geq 0.4 \\ \gamma_{0,t} \\ 0, \gamma_{0,t} \leq 0.1 \end{pmatrix}$$

Calculating the phrase intonation component of the Mandarin Chinese speech prosody by long-term weighted-moving-average or median filter. Preferably, the window size relates to the average length of a phrase and weights relate to the regression weights of the $F_0$ contour. Advantageously, the window length of the long-term weighted-moving-average filter for extracting phrase intonation effect is set in the range of approximately 0.80 to 1.00 seconds.

Calculating the coefficients of the second order weighted regression of the de-intonated pitch contour by subtracting from the phrase intonation effect over neighboring frames (with window size related to the average length of a syllable).

As described above, the $F_0$ contour is decomposed into lexical tone effect, phrase intonation effect, and random effect by means of a time-variant, weighted moving average (MA) filter in conjunction with weighted (placing more emphasis on vowels) least squares of the $F_0$ contour. Since lexical tone effect only exists in the voiced segments of Chinese syllables, the voiced-unvoiced ambiguity is resolved by the introduction of the weighted regression over neighboring frames, with window size related to the average length of a syllable and weights depends on the degree of periodicity.

FIG. 3A shows a least squares of the $F_0$ contour of a sentence. FIG. 3B shows the same contour after applying the weighted moving average (WMA) filter with weighted-least squares (WLS). The phrase intonation effect is estimated by the WMA filter. The tone effect corresponds to the constant terms of the WLS of the $F_0$ contour minus the phrase intonation effect. The following table illustrates that the phrase intonation effect can be ignored.

| (LTNlookahead, LTNlookback) | TER/TER reduction | CER/CER reduction |
|---|---|---|
| (0, 0) | 22.94% | 12.23% |
| (40, 40) | 20.51% | 12.07% |
| (50, 50) | 20.19% | 12.12% |
| (60, 60) | 20.35% | 12.05% |

(traceback delay=20, correlation smoothing radius=5, frame width =0.032)
(Lexical Modelling: Tonal Preme/Core-Final in training)
(phrase trigram LM)

The optimal performance of WMA filter is experimentally determined as around 1.0 second (as shown in above table), which can symmetrically cover rising and falling tones in most of the cases.

The following two tables illustrate that asymmetry negatively effects the TER (tone error rate). This is also the reason why WMA is not only a normalization factor for $F_0$, but also a normalization factor for phrase.

| (LTNlookahead, LTNlookback) | TER/TER reduction | CER/CER reduction |
|---|---|---|
| (50, 50) | 20.19% | 12.12% |
| (25, 25) | 21.29% | 12.08% |
| (25, 75) | 21.57% | 12.07% |
| (25, 50) | 21.09% | 12.19% |

(traceback delay=20, correlation smoothing radius=5, frame width=0.032)
(Lexical Modelling: Tonal Preme/Core-Final in training)
(phrase trigram LM)

| (LTNlookahead, LTNlookback) | TER/TER reduction | CER/CER reduction |
|---|---|---|
| (50, 50) | 23.54% (1691) (baseline) | 12.60% (905) (baseline) |
| (25, 25) | 25.27% (1816) (+7.33%) | 12.57% (903) (−0.22%) |
| (25, 75) | 25.12% (1805) (+6.67%) | 12.75% (916) (+1.22%) |
| (25, 50) | 24.41% (1754) (+3.66%) | 12.72% (914) (+0.99%) |

(traceback delay=20, correlation smoothing radius=5, frame width=0.032)
(Lexical Modelling: Preme/Core-Final in training)
(phrase trigram LM)

Extracting Temporal Properties of Voiced Pitch Movements

By the means of second order regression of the auto-correlation, information of voicing is extracted from the speech signal. If the constant term of the regression coefficients of the auto-correlation is greater than a given threshold, say 0.4, then the regression weight for this frame is set at 1.0. If the constant term of the regression coefficients of the auto-correlation is less than a given threshold, say 0.10, then the regression weight for this frame is set at 0.0. Otherwise it is set at the constant term of the regression coefficients of the auto-correlation. These weights are applied to the above second order weighted regression of the de-intonated $F_0$ contour and long-term weighted-moving-average or median filter of the phrase intonation component of the Mandarin Chinese speech prosody. These weights of the second order weighted regression of the de-intonation of the F0 contour are designed to emphasize/de-emphasize the voiced/unvoiced segments of the pitch contour in order to preserve the voiced pitch contour for the semi-voiced consonants. The advantage of this mechanism is that, even if the speech segmentation has slight errors, these weights with look-ahead adaptive-pruning trace back of the $F_0$ contour served as the on-line signal pre-processing front-end, will preserve the pitch contour of the vowels for the pitch contour of the consonants. This vowel-preserving property of the tone features has the ability to prevent model parameters from bias estimation due to speech segmentation errors.

By using a second order regression of the auto-correlation with lags corresponding to the reciprocal of the output of the look-ahead adaptive pruning trace back of $F_0$, information of periodicity is extracted from the speech signal. First the extracted pitch profile is processed using pitch dynamic time-warping (PDT) technique in order to get a smoothed (nearly no multiple pitch errors) pitch contour, then second-order weighted least squares are applied in order to extract the profiles of the pitch contour. Such profiles are represented by the regression coefficients. The constant regression coefficient is used for calculating weights required in the decomposition of the $F_0$ contour. The first and second of the regression coefficients are used for further reduction of the tone error rate. The best setting for windowing is around 110 ms, which is less than one syllable's length in normal speaking rate.

Generation of a Pseudo Feature Vector

According to the criteria of maximization of the local likelihood scores, pseudo feature vectors are generated for unvoiced segments of speech in order to prevent model parameters in HMM from bias estimation. This is done first by calculating the sum of the regression weights within a regression window. For a sum of weights less than a predefined threshold (e.g. 0.25), the normalized features are replaced by pseudo features generated according to the criteria of least squares (fall back to the de-generate case, equally weighted regression).

For clear silence regions, the local minimum path in look-ahead trace back produces random values for pitch estimates. Such a de-intonated $F_0$ estimate and its derivatives have mean zero in the assumption of prior equally distributed normalized features over neighboring frames and symmetrical property of the probability distribution of the normalized features. With minimal variance that ensures non-degenerate probability distribution in each state of HMM-based acoustic modeling. Since it is difficult to draw a clear line between voiced and unvoiced region in units of milli-seconds, in the voiced-unvoiced region, equally weighted regression is employed to smooth both traceable pitch in clear voiced segments and random pitch in clear silence region.

Tone Component

As described above, in a preferred embodiment, the tone component is defined as the locally, weighted regression of the de-intonated pitch contour over, preferably, 110 msec., which is less than one syllable length (in fact, approximately one average vowel length), in order to prevent from modeling the within-phase pitch contour. These weights in the local regression, are designed to emphasize/de-emphasize the voiced/unvoiced segments of the pitch contour in order to preserve the voiced pitch contour for the consonants (initial/preme). The main advantages of this mechanism are that, even if the speech segmentation has slight errors (it does not recognize small amount of the unvoiced as voiced), these weights will preserve the pitch contour of the vowel (final/toneme) and take it for granted into initial/premes. In this way, statistics of the statistical models are accumulated in the training process and later in the recognition process. Moreover, it allows simulating scores for initial/preme to prevent from hurting the tone recognition due to speech segmentation errors.

Experimental Setup

The experiments have been performed using a Philips large-vocabulary continuous-speech recognition system, which is a HMM-based system using standard MFCC features with first-order derivatives, sentence-based cepstral mean subtraction (CMS) for simple channel normalization, and Gaussian mixture densities with density-specific diagonal covariance matrices. Experiments were conducted on three different Mandarin continuous-speech corpora, the MAT corpus (telephone, Taiwan Mandarin), a non-public PC dictation database (microphone. Taiwan Mandarin), and the database of the 1998 Mainland Chinese 863 benchmarking. For the MAT and the PC dictation database, a speaker-independent system is used. For 863, a separate model is trained for each gender, and the gender is known during decoding. The standard 863 language-model training corpus (People's Daily 1993-4) contains the test set. Thus, the system already "knows" the entirety of the test sentences, not reflecting the real-life dictation situation. To obtain realistic performance figures, the LM training set has been "cleaned" by removing all 480 test sentences. The following table summarizes the corpus characteristics.

| Id | Traceback length | MAT | PC | 863 | Loss |
|---|---|---|---|---|---|
| D2 | Whole sentence | 27.0% | 19.2% | 24.3% | B/l |
| T1 | 20 frames (200 msec.) | 28.3% | 19.7% | 24.4% | 2.8% |
| T2 | 15 frames (150 msec.) | 28.0% | 20.0% | 24.3% | 2.9% |
| T3 | 10 frames (100 msec.) | 28.5% | 19.6% | 24.2% | 2.6% |

| | MAT | | PC Dictation | | 863 | |
|---|---|---|---|---|---|---|
| | Train | Test | Train | Test | Train | Test |
| Type | | | | | | |
| #Speakers | 721 | 26 | 241 | 20 | 2 × 83 | N/a |
| #Utterances | 28896 | 259 | 27606 | 200 | 92948 | 2 × 240 |
| #Syl./Utt. | 5.66 | 14.2 | 30.1 | 35.5 | 12.1 | 12.6 |
| TPP | — | 3.37 | — | 3.54 | — | 3.50 |
| Lexicon size | — | 42038 | — | 42038 | — | 56064 |
| $CPP_{bi}$ | — | 121.8 | — | 63.6 | — | 53.4 |
| $CPP_{tri}$ | — | 106.1 | — | 51.1 | — | 41.3 |
| $CPP_{tri,inside}$ | — | — | — | — | — | 14.4 |

PDAs are often assessed with respect to fine and gross pitch errors. Since it is assumed that the underlying existing algorithm has been extensively tuned, and the focus is on integration with speech recognition, the system has been optimized with respect to the tone error rate (TER) instead. All tables except the last one show TER. TER is measured by tonal-syllable decoding, where the decoder is given the following information for each syllable:

start and end frame (obtained by forced alignment), base-syllable identity (toneless, from the test script), and the set of tones allowed for this particular syllable Not all five lexical tones can be combined with all Chinese syllables. The tone perplexity (TPP) has been defined as the number of possible tones for a syllable averaged over the test set.

The first column in the following experiment tables show the experiment Ids (D1, D2, T1, etc.) which are intended to help to quickly identify identical experiments shown in more than one table.

Real-time/online DP Operation

The first experiments deal with the benefit of using Dynamic Programming at all. The following table shows a 10–15% TER reduction from DP for MAT and PCD. Only for the very clean 863 corpus, DP is not required. Since a real-life dictation system also has to deal with noise, DP is considered useful in any case to assure robustness.

| Id | Pitch extractor | MAT | PC | 863 | Gain |
|---|---|---|---|---|---|
| D1 | SHS only | 32.0% | 21.4% | 24.0% | b/l |
| D2 | SHS + DP | 27.0% | 19.2% | 24.3% | 8.4% |

The second set of experiments considers the benefits of partial traceback. Intuitively, the joint information of one syllable should be sufficient, i.e. around 20–25 frames. The following table shows that 10 frames are already enough to stabilize the pitch contour. Conservatively, 15 frames may be chosen.

Focussing on reducing the search effort, the following table shows the number of path recombinations (corpus average) for beam-pruning with different pruning thresholds. A 93% reduction at minimal increase of tone error rate can be achieved (P3). Conservatively, setup P2 may be chosen.

| Id | Threshold | Recomb. | MAT | PC | 863 | Loss |
|---|---|---|---|---|---|---|
| T2 | 0 | | 28.0% | 20.0% | 24.3% | 0% |
| P1 | 0.99 | 681 | 28.4% | 21.0% | 23.9% | 1.5% |
| P2 | 0.999 | 413 | 29.0% | 20.2% | 24.4% | 1.7% |
| P3 | 0.9999 | 305 | 28.6% | 20.2% | 24.7% | 1.4% |

Reducing the resolution from 48 quantization steps per octave to only 16 yields another vast reduction of path recombinations, but leads to some degradation (experiment R1 in the following table). This can be alleviated by fine-tuning the pitch after DP (R2).

| Id | Quantization | Recomb. | MAT | PC | 863 | Loss |
|---|---|---|---|---|---|---|
| P2 | 48 | 413 | 29.0% | 20.2% | 24.4% | B/l |
| R1 | 16 | 99 | 28.7% | 21.8% | 25.6% | 3.9% |
| R2 | 16, tuned | 99 | 29.4% | 20.8% | 24.5% | 1.5% |

Experimental Results for the Tonal Feature Vector

Experiments have been performed to verify improvements to the feature vector according to the invention. The test were started with a conventional feature vector $\bar{o}(t)=(\hat{F}_0(t); \Delta \hat{F}_0(t))$. The following table shows that almost the entire performance is due to $\Delta \hat{F}_0(t)$. Switching off $\hat{F}_0(t)$ has only minor effect (F2), while using it as the only feature leads to dramatic degradation of 52% (F3). Taking the log has no significant effect (F4).

| Id | Tone features | MAT | PC | 863 | Gain |
|---|---|---|---|---|---|
| F1 | $\hat{F}_0(t); \Delta\hat{F}_0(t)$ | 37.1% | 28.2% | 29.9% | B/l |
| F2 | $\Delta\hat{F}_0(t)$ only | 37.3% | 28.8% | 30.1% | −1.2% |
| F3 | $\hat{F}_0(t)$ only | 48.7% | 49.8% | 44.3% | −52% |
| F4 | Log $\hat{F}_0(t)$; log $\Delta\hat{F}_0(t)$ | 36.5% | 28.3% | 29.8% | 0.4% |

The following table shows the effect of normalization, being the effectiveness of eliminating speaker and phrase effect by subtracting the averaged neighborhood pitch (the weight $w(f, t)=1$, equation (2)). Of the three different window widths (a moving average of 0.6 sec., 1.0 sec. and 1.4 sec., respectively), the 1-second window wins by a small margin.

| Id | Normalization | MAT | PC | 863 | Gain |
|---|---|---|---|---|---|
| F1 | None | 37.1% | 28.2% | 29.9% | B/l |
| N1 | Moving av. 0.6 sec. | 33.0% | 25.7% | 29.7% | 6.8% |
| N2 | Moving av. 1.0 sec. | 32.1% | 25.9% | 29.1% | 8.0% |
| N3 | Moving av. 1.4 sec. | 32.2% | 26.5% | 29.6% | 6.8% |

The following table compares normalizing log $\hat{F}_0(t)$ with a moving average window of 1.0 sec. to normalizing to the sentence mean. Both the MAT and the 863 corpus consist of short utterances, with little phrase effect. Thus, for MAT, sentence-based normalization performs equally to the proposed method. For 863 on the other hand, where the gender bias is already accounted for by the gender-dependent models, no improvements are obtained over the unnormalized case. For the PC Dictation corpus, with long utterances and strong phrase effect, an improvement could not be observed as well.

| Id | Normalization | MAT | PC | 863 | Gain |
|---|---|---|---|---|---|
| F4 | None | 36.5% | 28.3% | 29.8% | B/l |
| N4 | Moving av. 1.0 sec. | 33.3% | 24.8% | 28.7% | 8.3% |
| N5 | Sentence mean | 33.2% | 28.6% | 30.1% | 2.4% |

The following table shows the effect of using the 2nd-order derivative $\Delta\Delta\hat{F}_0(t)$. A significant improvement of 9% is observed where the microphone setups benefit most.

| Id | $\Delta\Delta\hat{F}_0(t)$ | MAT | PC | 863 | Gain |
|---|---|---|---|---|---|
| N2 | No | 32.1% | 25.9% | 29.1% | B/l |
| F5 | Yes | 30.7% | 22.9% | 25.9% | 9.0% |

The following table shows that using voicing $v(f; t)$ as a feature results in a gain of 4.5%, which can be further tuned to 6.4% by simple smoothing to reduce noise.

| Id | Voicing feature | MAT | PC | 863 | Gain |
|---|---|---|---|---|---|
| F5 | None | 30.7% | 22.9% | 25.9% | b/l |
| V1 | $v(f; t)$ raw | 29.9% | 20.8% | 25.5% | 4.5% |
| V2 | $v(f; t)$ smoothed | 29.1% | 20.7% | 24.8% | 6.4% |

Another 6.1% is achieved from the derivative of the smoothed voicing, but no further reduction from the 2nd derivative as illustrated in the following table.

| Id | Voicing feature | MAT | PC | 863 | Gain |
|---|---|---|---|---|---|
| V2 | $v(f; t)$ smoothed | 29.1% | 20.7% | 24.8% | 6.4% |
| V3 | $v(f; t)$ smoothed, plus $1^{st}$ derivative | 27.0% | 19.5% | 23.5% | 6.1% |
| V4 | $v(f; t)$ smoothed, plus $1^{st}$ and $2^{nd}$ derivative | 27.7% | 19.7% | 23.7% | 4.5% |

A final small improvement (2.5%) is obtained by using $v(f; t)$ as the weight in local normalization, as shown in the following table.

| Id | Normalization | MAT | PC | 863 | Gain |
|---|---|---|---|---|---|
| V3 | Unweighted | 27.0% | 19.5% | 23.5% | 6.1% |
| N6 | Weigthed | 26.2% | 19.0% | 23.0% | 2.5% |

Taking all above optimization steps with respect to the feature vector together (from experiment F1 to N6), an average TER improvement of 28.4% has been achieved compared to the starting vector $\bar{o}(t)=(\hat{F}_0(t); \Delta\hat{F}_0(t))$.

Combination with Language Model

Experiments have also confirmed that an optimal tone error rate also leads to the best overall system performance. To show this, character error rates (CER) of the integrated system have been measured for selected setups, using a phrase-based recognition lexicon and phrase-bigramn/trigram language model. For completeness and comparability, the last two rows of the following table show results obtained with the test set inside ("System performance test").

| Id | Tone features | MAT | PC | 863 | Gain |
|---|---|---|---|---|---|
| | Bigram | | | | |
| — | No tone model | 42.4% | 18.9% | 11.6% | b/l |
| F1 | $\hat{F}_0(t); \Delta\hat{F}_0(t)$ | 38.6% | 14.5% | 9.5% | 17.0% |
| N2 | +$\hat{F}_0(t)$ normalization | 36.4% | 13.7% | 9.7% | 19.5% |
| F5 | +$\Delta\Delta\hat{F}_0(t)$ | 35.0% | 13.3% | 8.6% | 24.3% |
| V3 | +voicing features | 34.4% | 12.6% | 8.3% | 26.9% |
| N6 | +weighting | 34.2% | 12.9% | 8.1% | 27.3% |
| | Trigram | | | | |
| — | no tone model | 40.4% | 16.4% | 10.4% | b/l |
| N6 | best tone model | 33.1% | 12.0% | 7.3% | 25.0% |
| | 863 benchmark: Trigram, test-set inside LM training | | | | |
| — | no tone model | — | — | 3.8% | b/l |
| N6 | best tone model | | | 3.4% | 10.6% |

The outcome confirms the good correspondence between TER and CER. Secondly, the overall relative CER improvement from tone modeling reaches an extraordinary 27.3% on average (bigram), with the smallest gain on telephone speech (19.3%), and exceeding 30% for the two microphone corpora. For trigram, gains are slightly smaller because the trigram can disambiguate more cases from the linguistic context only, for which the bigram requires the tone model's assistance. (The extreme case is the 863 benchmarking LM—test set inside LM training—where most tones are deducted correctly from the context, and tone modeling helps 10.6%.

Summary

Important for constructing on-line, robust tone feature extraction is to use the joint, local information of periodicity in the neighborhood of the concurrent voiced time frame. The present invention eliminates determining tone features directly from marginal information of periodicity at the concurrent time frame. Instead, the degree of voicing is treated as the distribution of the fundamental frequency.

Important aspects, robust feature extraction, which may also be used in combination with conventional techniques, are:

Extracting pitch-information by determining a measure inside the speech signal, preferably based on Subharmonic Summation, On-line look-ahead adaptive pruning trace back of the fundamental frequency, where the adaptive pruning is based on the degree of voicing and the joint information for preferably 0.50 s ago, Removing phrase intonation, which is defined as the long-term tendency of the voiced $F_0$ contour. This effect is approximated by a weighted-moving average of the $F_0$ contour, with weights preferably related to the degree of the periodicity of the signal, The means of second order weighted regression of the de-intonation of the $F_0$ contour over certain time frames, where the maximal window length is corresponding to the length of a syllable, with weights related to the degree of the periodicity of the signal, Second order regression of the auto-correlation over certain time frames, where the maximal window length is corresponding to the length of a syllable, with time lag corresponding to the reciprocal of the pitch estimate from look-ahead tracing back procedure, and Generation of a pseudo feature in voiced-unvoiced segments of speech signal. Pseudo feature vectors are generated for unvoiced speech, according to the least squares criteria (fall to the de-generate case, equally weighted regression).

Figure 4:
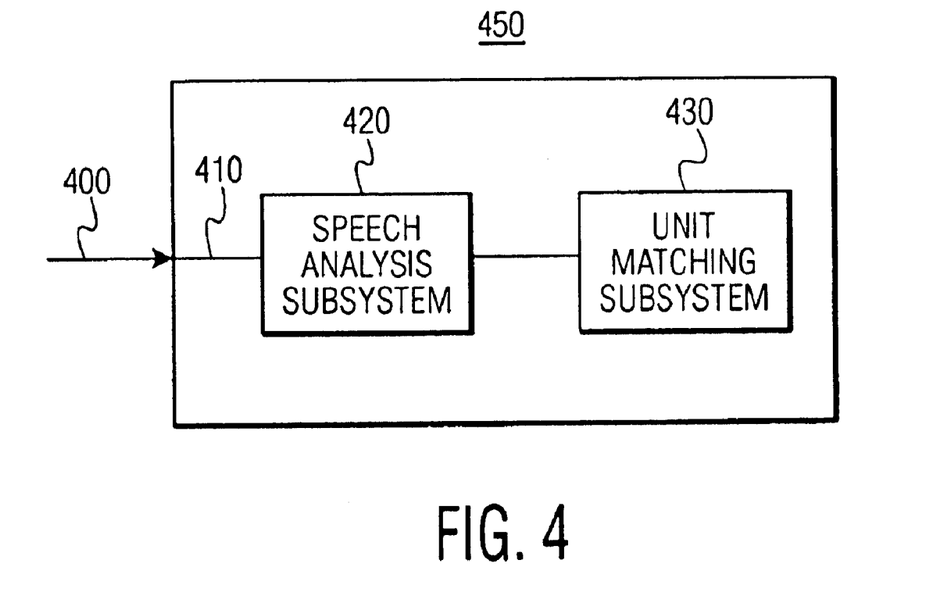
FIG. 4 is a block diagram of the system according to the present invention.

FIG. 4 is a block diagram illustrating a speech recognition system 450 for recognizing a time-sequential input signal 400 representing speech spoken in a tonal language. The system 450 includes an input 410 for receiving the input signal; a speech analysis subsystem 420 for representing a segment of the input signal as an observation feature vector; and a unit matching subsystem 430 for matching the observation feature vector against an inventory of trained speech recognition units, each unit being represented by at least one reference feature vector. The feature vector includes a component derived from an estimated degree of voicing of the speech segment represented by the feature vector. Unvoiced segments of speech are represented by a pseudo feature vector.

What is claimed is:

1. A speech recognition system for recognizing a time-sequential input signal representing speech spoken in a tonal language; the system including:

an input for receiving the input signal;

a speech analysis subsystem for representing a segment of the input signal as an observation feature vector; and a unit matching subsystem for matching the observation feature vector against an inventory of trained speech recognition units, each unit being represented by at least one reference feature vector;

wherein the feature vector includes a component derived from an estimated degree of voicing of the speech segment represented by the feature vector and wherein unvoiced segments of speech are represented by a pseudo feature vector.

2. A speech recognition system as claimed in claim 1, wherein the derived component represents the estimated degree of voicing of the speech segment.

3. A speech recognition system as claimed in claim 1, wherein the derived component represents a derivative of the estimated degree of voicing of the speech segment.

4. A speech recognition system as claimed in claim 1, wherein the estimated degree of voicing is smoothed.

5. A speech recognition system as claimed in claim 1, wherein the degree of voicing is a measure of a short-time auto-correlation of an estimated pitch contour.

6. A speech recognition system as claimed in claim 5, wherein the measure is formed by the regression coefficients of the auto-correlation contour.

7. A speech recognition system as claimed in claim 5, wherein the estimated pitch is obtained by removing a phrase intonation effect from an estimated pitch contour representing the speech segment.

8. A speech recognition system as claimed in claim 7, wherein the phrase intonation effect is represented by a weighted moving average of the estimated pitch contour.

9. A speech recognition system as claimed in claim 8, wherein a weight of the weighted moving average represents the degree of voicing in the segment.

10. A speech recognition system as claimed in claim 1, wherein the feature vector includes a component representing a derivative of an estimated pitch of the speech segment.

11. A speech recognition system as claimed in claim 1, wherein a segment is considered unvoiced if a sum of regression weights of an estimated pitch contour within a regression window.

12. A speech recognition system as claimed in claim 1, wherein the pseudo feature vector includes pseudo features generated according to a least squares criterion.

13. A method for recognizing a time-sequential input signal representing speech spoken in a tonal language; the method comprising the steps of:

receiving the input signal;

representing a segment of the input signal as an observation feature vector; and matching the observation feature vector against an inventory of trained speech recognition units, each unit being represented by at least one reference feature vector;

wherein the feature vector includes a component derived from an estimated degree of voicing of the speech segment represented by the feature vector and wherein unvoiced segments of speech are represented by a pseudo feature vector.

14. A method as claimed in claim 13, wherein the degree of voicing is a measure of a short-time auto-correlation of an estimated pitch contour.

15. A method as claimed in claim 14, wherein the estimated pitch is obtained by removing a phrase intonation effect from an estimated pitch contour representing the speech segment.

16. A method as claimed in claim 15, wherein the phrase intonation effect is represented by a weighted moving average of the estimated pitch contour.

17. A method as claimed in claim 16, wherein a weight of the weighted moving average represents the degree of voicing in the segment.

18. A method as claimed in claim 13, wherein a segment is considered unvoiced if a sum of regression weights of an estimated pitch contour within a regression window.

19. A method as claimed in claim 13, wherein the pseudo feature vector includes pseudo features generated according to a least squares criterion.

* * * * *